United States Patent
Rodriguez et al.

(10) Patent No.: US 7,821,987 B2
(45) Date of Patent: Oct. 26, 2010

(54) WIRELESS WIDE AREA NETWORK (WWAN) MOBILE GATEWAY WITH COMMUNICATION PROTOCOL MANAGEMENT

(75) Inventors: Romeo Hernandez Rodriguez, San Diego, CA (US); Arockia Sunder, San Diego, CA (US); Kotaro Matsuo, Poway, CA (US); Michael D. Johnson, Longmont, CO (US)

(73) Assignee: Kyocera Corporation, Kyoto (JP)

( * ) Notice: Subject to any disclaimer, the term of this patent is extended or adjusted under 35 U.S.C. 154(b) by 1008 days.

(21) Appl. No.: 11/562,774

(22) Filed: Nov. 22, 2006

(65) Prior Publication Data

US 2008/0117860 A1 May 22, 2008

(51) Int. Cl.
*H04W 4/00* (2009.01)
(52) U.S. Cl. .............. 370/328; 455/552.1; 455/553.1; 455/557

(58) Field of Classification Search ............... 370/328, 370/401, 402; 455/552.1, 553.1, 557
See application file for complete search history.

(56) References Cited

U.S. PATENT DOCUMENTS

| 5,202,899 A | 4/1993 | Walsh |
| 5,751,222 A | 5/1998 | Trainor et al. |
| 2003/0185189 A1 | 10/2003 | Chitrapu et al. |
| 2004/0037255 A1* | 2/2004 | Joong et al. ............... 370/338 |
| 2005/0048997 A1 | 3/2005 | Grobler |
| 2005/0090248 A1* | 4/2005 | Shen et al. .............. 455/432.1 |
| 2006/0221987 A1 | 10/2006 | Polson |

* cited by examiner

*Primary Examiner*—Kamran Afshar
*Assistant Examiner*—Munjal Patel

(57) ABSTRACT

A wireless wide area network (WWAN) mobile gateway is configured to execute a selected communication protocol from a plurality of communication protocols to communicate with a connected WWAN modem card connected through a WWAN device interface. The connected WWAN modem card is one of a plurality of WWAN modem cards where each of the WWAN modem cards is configured to communicate using one of the plurality of communication protocols and includes a WWAN transceiver for exchanging WWAN signals with a WWAN communication system.

14 Claims, 2 Drawing Sheets

WIRELESS WIDE AREA NETWORK (WWAN) MOBILE GATEWAY WITH COMMUNICATION PROTOCOL MANAGEMENT

TECHNICAL FIELD

The invention relates in general to wireless communication systems and more specifically to wireless wide area network (WWAN) mobile gateways.

BACKGROUND

WWAN mobile gateways, also sometimes referred to as cellular mobile gateways, cellular routers, mobile routers, and other names, communicate with a WWAN communication system such as a cellular communication system and provide packet data services to user devices. WWAN mobile gateways exchange data with wireless user devices and/or wired user devices using a local area network (LAN) interface. The LAN interface may include a wireless LAN (WLAN) transceiver, such as Wi-Fi access point, and/or a wired LAN interface, such as an Ethernet interface, for example. Many WWAN mobile gateways include an interface for connecting to a WWAN modem card. WWAN modem cards include a WWAN transceiver such as a cellular transceiver for exchanging data with a WWAN communication system that is typically connected to a public switching system such as a public switched telephone network (PSTN) and/or the Internet. The WWAN mobile gateway performs the necessary timing and translation functions to provide data packet service to the users by connecting the LAN to the WWAN communication system.

Conventional WWAN mobile gateways are limited in that the WWAN mobile gateways are configured to communicate with WWAN modem cards using a single communication protocol. The communication protocol is typically a standard communication protocol that exchanges a limited type of information.

Accordingly, there is a need for an apparatus, system, and method for communicating with a WWAN modem card using one of a plurality of communication protocols.

SUMMARY

A wireless wide area network (WWAN) mobile gateway is configured to execute a selected communication protocol from a plurality of communication protocols to communicate with a connected WWAN modem card connected through a WWAN device interface. The connected WWAN modem card is one of a plurality of WWAN modem cards where each of the WWAN modem cards is configured to communicate using one of the plurality of communication protocols and includes a WWAN transceiver for exchanging WWAN signals with a WWAN communication system.

DETAILED DESCRIPTION

In an exemplary embodiment, a WWAN mobile gateway (mobile gateway) within a communication network exchanges data with at least one user device and is configured to connect to any of one of a plurality of WWAN modem cards that can communicate over a WWAN communication link with a WWAN system such as a cellular communication system. Each of the plurality of modem cards communicates with the mobile gateway using one of a plurality of communication protocols. A default communication protocol facilitates communication with all of the WWAN modem cards. At least one WWAN modem card, however, provides additional features when communicating using an enhanced communication protocol. When a WWAN modem card is inserted into the mobile gateway, the mobile gateway identifies the WWAN modem card or otherwise determines the appropriate protocol for communicating with the WWAN modem card. If the mobile gateway determines that the inserted WWAN modem card is an enhanced feature WWAN modem card and can communicate using an enhanced communication protocol, the mobile gateway executes an enhanced protocol code corresponding to the enhanced communication protocol enabling the mobile gateway to use the additional features supported by the enhanced feature WWAN modem card. The execution of the enhanced protocol code may include loading replacement code from memory that replaces at least a portion of a default protocol code, invoking subroutines that enable the additional features, or other actions that allow the mobile gateway to access instructions of the enhanced protocol code. The additional features may include identification of the network type, indication of signal strength, indication of signal quality, enablement of short message service (SMS) related features, presentation of device diagnostics information and presentation of network diagnostics. The indication of the network type may include an indication of whether the network 100 operates in accordance with CDMA2000 1X Ev-DO (Evolution Data Optimized), CDMA2000 1X Ev-DO, DataTAC, GPRS (General Packet Radio Service) or EDGE (Enhanced Data rates for Global Evolution) protocols. Device diagnostic information may include a electronic serial number (ESN) or mobile directory number (MDN) information. Network diagnostic information may include A-key, ANAAA key, ANHA key, and DMU key information.

Figure 1:
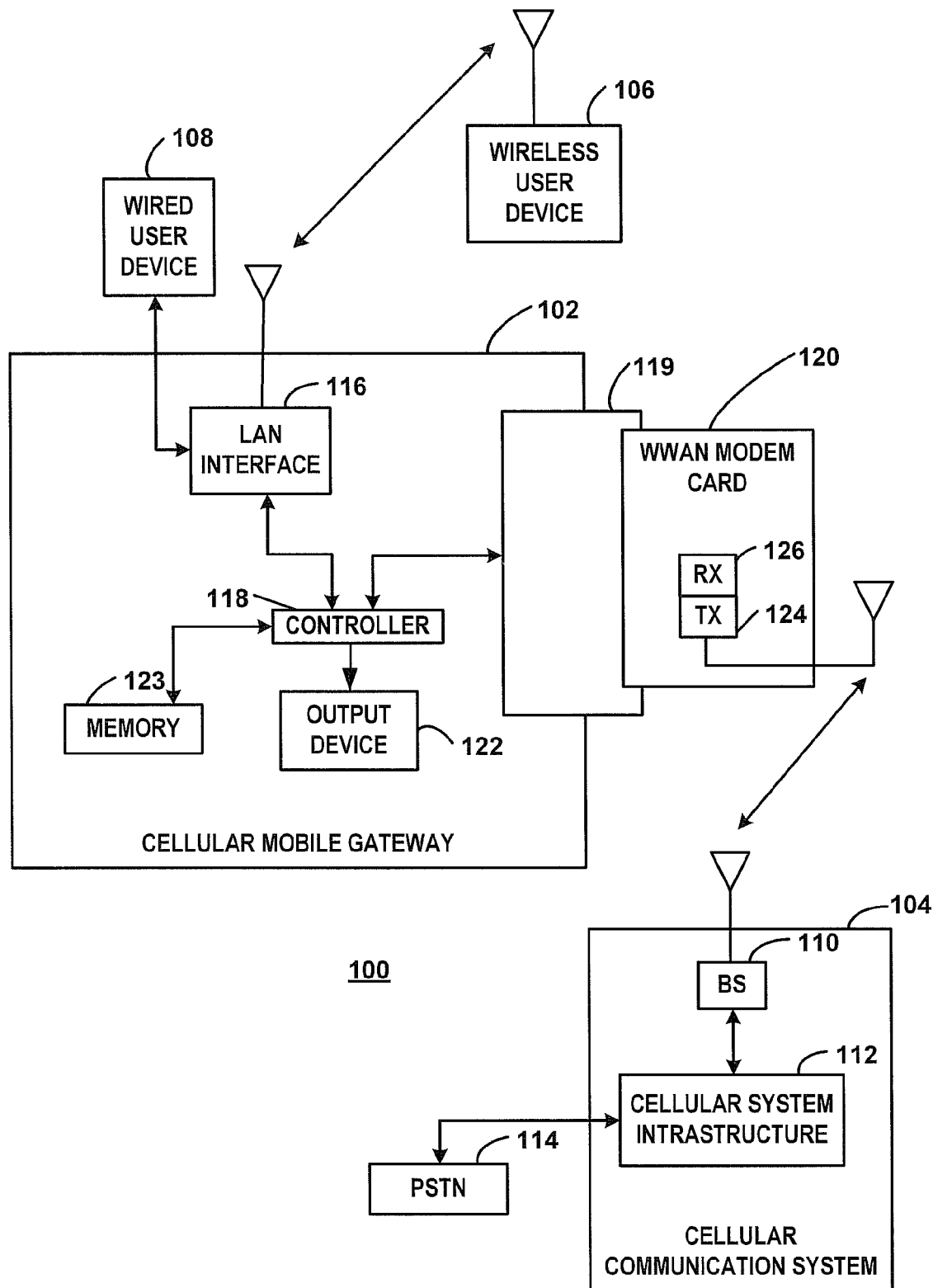
FIG. 1 is a block diagram of a WWAN mobile gateway within a communication network in accordance with the exemplary embodiment.

FIG. 1 is a block diagram of a cellular WWAN mobile gateway 102 within a communication network 100 in accordance with the exemplary embodiment of the invention. The WWAN mobile gateway 102 communicates with a WWAN communication system such as a cellular communication system 104 and can exchange data with a wireless user device 106 and/or a wired user device 108. The cellular communication system 104 provides cellular communication services through at least one base station 110 connected to a cellular system infrastructure 112. The cellular system infrastructure 112 is connected to a public switched telephone network (PSTN) 114 through a mobile switching center (MSC) (not shown). In the exemplary embodiment, the cellular communication system 104 operates in accordance Code Division Multiple Access (CDMA) standards such as cdma2000 1X, 1xEV-DO, and W-CDMA. In some circumstances, the cellular communication system 104 may operate with other standards such as OFDM based standards or GSM standards, for example. Accordingly, the cellular communication system 104 is any wireless wide area network (WWAN). The various functions and operations of the blocks described with reference to the cellular communication system 104 may be implemented in any number of devices, circuits, or elements. Two or more of the functional blocks may be integrated in a single device and the functions described as performed in any single device may be implemented over several devices. For example, at least portions of the functions of the cellular system infrastructure 112 may be performed by the base station 110 or the MSC in some circumstances.

The WWAN mobile gateway 102 exchanges data with the wireless user device 106 and, in some cases, a wired user device 108 using a LAN interface 116. The WWAN mobile gateway 102 further comprises a controller 118 coupled to a WWAN device interface 119, output device 122, a memory 123, and the LAN interface 116. The controller 118 controls the operation and the communication between the WWAN device interface 119, output device 122 and the LAN interface 116 as well as performing other functions and facilitating the overall operation of the WWAN mobile gateway 102.

In the exemplary embodiment, a WWAN modem card 120 such as a cellular modem card plugs into and is accepted by the WWAN device interface 119 which may be in a form of a modem port in the WWAN mobile gateway 102. The WWAN device interface 119 includes appropriate hardware to secure a WWAN modem card 120 and electrical conductors to form electrical connections between conductors of the WWAN modem card 120 and the controller 118. The WWAN device interface 119 may include additional components or circuitry for interfacing with the WWAN modem card 120. Since the plurality of modem cards have a set of pins arranged in a standard configuration, each of the plurality of WWAN modem cards can be connected to the WWAN mobile gateway 102. The WWAN device interface 119 is, therefore, configured to connect to any one of the WWAN modem cards 120 of a plurality of WWAN modem cards. Each of the plurality of WWAN modem cards is configured to communicate with the WWAN device interface 119 using a communication protocol. At least one of the WWAN modem cards provides at least one additional function when communicating using an enhanced communication protocol. In the exemplary embodiment, all of the WWAN modem cards can communicate using a standard communication protocol. The controller 118 executes a selected communication protocol of a plurality of the communication protocols to communicate with a connected WWAN modem card 120 through the WWAN device interface 119. The controller 118 selects the communication protocol by determining the capabilities of the WWAN modem card 120 that is inserted into the WWAN device interface 119.

Any of numerous techniques may be used to identify the communication protocol supported by the WWAN modem card 120. In the exemplary embodiment, the controller 118 sends an inquiry message requesting the WWAN modem card 120 to respond with a communication protocol identifier. If the WWAN modem card 120 supports a protocol other than the standard (default) protocol, the WWAN modem card 120 responds with a communication protocol identifier. If the WWAN modem card 120 only supports the standard protocol, the inquiry message can not be decoded by WWAN modem card 120 and the WWAN modem card 120 does not respond. An example of another suitable technique for detecting the communication protocol supported by the WWAN modem card 120 includes reading a serial number. Another example includes sending a message that can only be decoded with a corresponding protocol and determining that the WWAN modem card 120 supports the communication protocol if an acknowledgement or response is received from the WWAN modem card 120. Accordingly, the controller 118 is configured to identify the communication protocol corresponding to the WWAN modem card 120 after the card is inserted into the WWAN device interface 119.

After identifying the communication protocol, the controller 118 uses the selected communication protocol to communicate with the WWAN modem card 120. In the exemplary embodiment, the controller 118 executes code corresponding to the selected communication protocol. Any of numerous methods may be used to execute the code. For example, the appropriate code may be retrieved from memory 123 and loaded into the controller 118. In some circumstances, subroutines may be invoked to facilitate additional functions not supported by the default protocol. Accordingly, the controller 118 executes default code that corresponds to the default communication protocol when the WWAN modem card 120 supports only the default communication protocol and executes an enhanced code that enables communication using an enhanced communication protocol when the WWAN modem card 120 supports the enhanced communication protocol. The enhanced communication protocol enables additional functions of the WWAN modem card 120 that are not available using the default communication protocol.

The WWAN modem card 120 includes a WWAN transceiver 125 comprising a transmitter 124 and a receiver 126 and is configured to exchange data as WWAN signals over a cellular communication link with the cellular communication system 104. The transmitter 124 transmits cellular uplink signals (reverse link signals) to the cellular base station 110 of the cellular communication system 104 and the receiver 126 is configured to receive cellular downlink signals (forward link signals) from the cellular base station 110 through the cellular communication link. The WWAN modem card 120 is adapted to exchange data corresponding to the packet data service with the cellular communication system 104 and to receive the cellular downlink signal through the cellular communication link. When the default communication protocol is used, the information that can be received from the WWAN modem card is referred to as default information. Examples of default information include connection status (connected or not connected), throughput speed and usage time.

When an enhanced communication protocol is used, the controller 118 can receive additional information in addition to the default information. An example of additional information include WWAN signal quality information from the WWAN modem card 120 that indicates or is otherwise related to the quality of the communication link between the WWAN modem card 120 and the cellular communication system 104. Examples of other additional information include network type, signal strength, device diagnostics information and network diagnostics information.

As described below, the signal quality information may be a parameter such as signal to noise ratio (SNR), or a may be an observed rate of successful transmissions. Based on the signal quality information, the controller 118 generates control signals to control the output device 122. The controller 118 may be connected directly to the output device 122 or may be connected through other circuitry. For example, the controller 118 may be connected to a digital to analog controller (DAC) (not shown) that generates an analog voltage to one or more LEDs. The output device 122 is responsive to control signals generated by the controller 118 to indicate a signal quality of at least one cellular downlink (forward link) signal. The controller 118 generates the control signals based on one or more quality indicators provided by the WWAN modem card 120. In the exemplary embodiment, the controller 118 generates signals in accordance with a received signal strength indicator (RSSI) provided by the WWAN modem card 120. The controller 118, however, may use other indicators and combinations of indicators to generate control signals that result in an indication of cellular signal quality when applied to the output device 122. Examples of other signal quality indicators that can be used by the controller 118 include signal to noise (SNR), and data throughput parameters such as bit error rates (BER), total number or successfully received data packets, a percentage of successfully received data packets, and data throughput through the cellular communication link. The controller 118 may also process multiple quality indicators to generate the control signals. For example, the controller 118 may generate control signals based on RSSI and SNR in some situations.

The additional information may be accessed by external devices that are in communication with the WWAN mobile gateway 102. For example, a laptop computer connected through a packet data network such as the Internet may access the additional information with the appropriate authorization and authentication. Information such as real time packet data throughput, RSSI, or BER of the WWAN signals may be provided via a graphical user interface on the laptop.

The additional information available may include control signals for controlling, configuring, adjusting or otherwise accessing the operations of the WWAN mobile gateway 102. For example, an enhanced function of the WWAN modem card 120 may include receiving short massage service (SMS) messages and generating corresponding messages or control signals to change the operation of the WWAN mobile gateway. The maximum number of WLAN users allowed to access the WWAN mobile gateway 102 maybe changed, for instance. Further, the WWAN mobile gateway 102 may be reset for diagnostic purposes using SMS. Some or all of the control functionality available through a packet switched network may be enabled using the SMS additional feature with an enhanced feature WWAN modem card 120.

In the exemplary embodiment, the LAN interface 116 can include a wired LAN interface, a wireless LAN (WLAN) interface or both. The LAN interface 116 may include an interface port (not shown) for exchanging signals with the wired user device 108 in accordance with a wired LAN protocol. An example of a suitable wired LAN protocol includes an Ethernet protocol. Furthermore, a WLAN interface within the LAN interface 116 may include a wireless communication modem (not shown) exchanging wireless signals with wireless user device 106 in accordance with a WLAN protocol. An example of a suitable WLAN includes a wireless access point that provides packet data service to one or more wireless devices in accordance with IEEE 802.11 protocol and wireless fidelity (WiFi).

Figure 2:
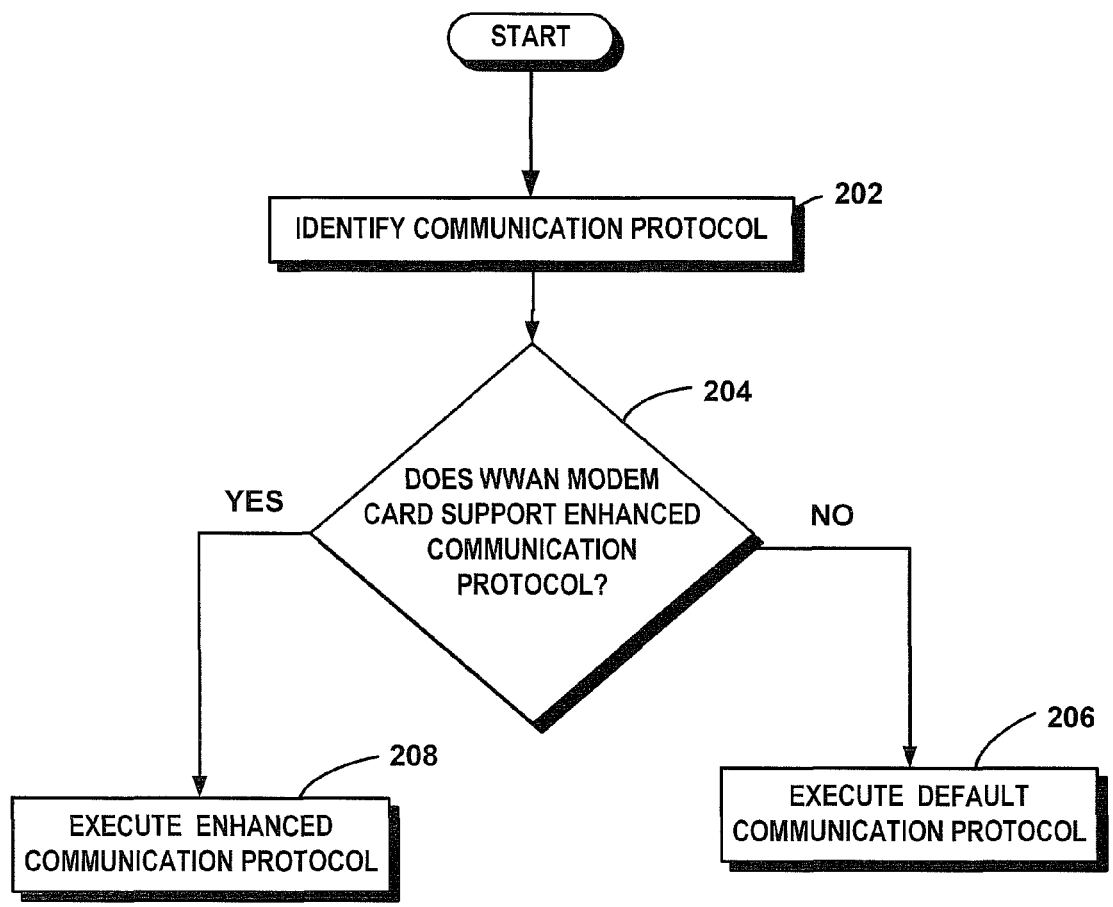
FIG. 2 is a flow chart of a method of communicating with a wireless wide area network (WWAN) modem card in accordance with the exemplary embodiment.

FIG. 2 is a flow chart of a method of communicating with a WWAN modem card in accordance with the exemplary embodiment. Although the method may be performed by any combination of hardware, software, and/or firmware or in any of numerous devices, the method is executed by the controller 118 in the WWAN mobile gateway 102.

At step 202, the WWAN mobile gateway 102 identifies the communication protocol supported by the WWAN modem card 120 connected to the WWAN device interface 119. In the exemplary embodiment, the controller 118 invokes an initialization procedure that includes inquiry messages, responses and acknowledgments, often referred to as "handshakes". After executing the handshakes corresponding to the default communication protocol, the controller 118 sends an inquiry message only supported by an enhanced communication protocol. If an adequate response is received from the WWAN modem card 120, it is determined that the WWAN modem card 120 supports the enhanced communication protocol. As explained above, any of several other techniques may be used to determine the communication protocol that is supported by the WWAN modem card 120.

At step 204, the WWAN mobile gateway 102 determines whether the WWAN modem card 120 supports the enhanced communication protocol. If the WWAN modem card 120 supports the enhanced communication protocol, the method continues at step 208. Otherwise, the method proceeds to step 206.

At step 206, the controller 118 executes the default communication protocol to communicate with the WWAN modem card 120. In the exemplary embodiment, the standard communication protocol is supported by the plurality of WWAN modem cards and is the default communication protocol. Accordingly, the controller 118 continues to execute the default code to communicate using the default communication protocol.

At step 208, the controller 118 executes the enhanced protocol code. In the exemplary embodiment, enhanced protocol code corresponding to the enhanced communication protocol supported by the WWAN modem card 120 is retrieved from memory 123 and loaded in the controller 118 for execution. Other techniques may be used to execute the enhanced protocol code. For example, subroutines may be used to facilitate the enhanced features provided by the enhanced feature WWAN modem card 120. As the enhanced protocol code is executed, at least one enhanced function is enabled in addition to the set of default functions by the enhanced feature WWAN modem card 120.

Although the above examples are directed to a single standard communication protocol and a single enhanced communication protocol, any number of enhanced protocols may be used. Accordingly, the mobile gateway may determine which protocol of a numerous enhanced communication protocols is supported by the connected modem card. The mobile gateway access the corresponding protocol code to communicate using the particular enhanced communication protocol.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A wireless wide area network (WWAN) mobile gateway comprising:

a local area network (LAN) interface configured to exchange data with at least one user device;

a wireless wide area network (WWAN) device interface configured to connect to a WWAN modem card of a plurality of WWAN modem cards, each of the plurality of WWAN modem cards configured to communicate with the WWAN device interface using a communication protocol of a plurality of communication protocols and comprising a WWAN transceiver configured to exchange WWAN signals with a WWAN communication system, the plurality of communication protocols comprising a default communication protocol enabling an execution of a set of default functions by the plurality of WWAN modem cards and an enhanced communication protocol enabling execution of at least one enhanced function in addition to the set of default functions by an enhanced feature WWAN modem card of the plurality of WWAN modem cards; and a controller configured to send an inquiry message through the WWAN device interface requesting a communication protocol identifier to the WWAN modem card and to execute, in response to determining that no response to the inquiry message was received through the WWAN device interface, the default communication protocol to communicate with the WWAN modem card through the WWAN device interface.

2. The WWAN mobile gateway of claim 1, wherein the controller is further configured to execute the enhanced communication protocol in response to receiving the communication protocol identifier through the WWAN device interface.

3. The WWAN mobile gateway of claim 2, wherein the communication protocol identifier identifies the enhanced communication protocol from a plurality of enhanced communication protocols 4. The WWAN mobile gateway of claim 1, wherein the set of default functions comprise exchanges of default information through the WWAN device interface and the at least one enhanced function comprises exchanges of additional information through the WWAN device interface, the additional information is additional to the default information.

5. The WWAN mobile gateway of claim 4, wherein the additional information is selected from the group consisting of WWAN signal power level, WWAN received signal strength, network type, device diagnostic information, network diagnostic information, and any suitable combination of the foregoing information.

6. The WWAN mobile gateway of claim 1, wherein the at least one enhanced function comprises providing a control signal to the controller based on a short message service (SMS) message received at the enhanced function WWAN modem card.

7. The WWAN mobile gateway of claim 1, further comprising:
a memory device configured to store enhanced protocol code for executing the enhanced communication protocol.

8. A method for communicating with a wireless wide area network (WWAN) modem card performed at a WWAN mobile gateway, the method comprising:
sending an inquiry message to a WWAN modem card connected to the WWAN mobile gateway, the inquiry message requesting a communication protocol identifier;
determining that the WWAN modem card connected to the WWAN mobile gateway supports an enhanced communication protocol only if a response to the inquiry message is received from the WWAN modem card; and
using the enhanced communication protocol to communicate with the WWAN modem card.

9. The method of claim 8, wherein the using the enhanced communication protocol enables at least one enhanced function in addition to a set of default functions supported by a default communication protocol.

10. The method of claim 9, wherein the default communication protocol enables an execution of a set of default functions by a plurality of WWAN modem cards and the enhanced communication protocol enables execution of at least one enhanced function, in addition to the set of default functions, by an enhanced feature WWAN modem card of the plurality of WWAN modem cards.

11. The method of claim 10, wherein the set of default functions comprise exchanges of default information through a WWAN device interface of the WWAN mobile gateway connected to the WWAN modem card and the at least one enhanced function comprises exchanges of additional information through the WWAN device interface, the additional information is additional to the default information.

12. The method of claim 11, wherein the additional information is selected from the group consisting of WWAN signal power level, WWAN received signal strength, network type, device diagnostic information, network diagnostic information, and any suitable combination of the foregoing information.

13. The method of claim 10, wherein the at least one enhanced function comprises providing a control signal to the controller based on a short message service message received at the enhanced function WWAN modem card.

14. The method of claim 8, further comprising:
retrieving from a memory enhanced protocol code corresponding to the enhanced communication protocol;
loading the enhanced protocol code into a controller; and
executing the enhanced protocol code.

* * * * *